(12) United States Patent
Nagayama (10) Patent No.: US 7,422,291 B2
(45) Date of Patent: Sep. 9, 2008

(54) RETAINER FOR FIXING TERMINALS OF SPRINGS

(75) Inventor: Masaki Nagayama, Tochigi (JP)

(73) Assignee: TS TECH Co., Ltd., Saitama (JP)

( * ) Notice: Subject to any disclaimer, the term of this patent is extended or adjusted under 35 U.S.C. 154(b) by 209 days.

(21) Appl. No.: 11/169,352

(22) Filed: Jun. 29, 2005

(65) Prior Publication Data

US 2006/0152063 A1    Jul. 13, 2006

(30) Foreign Application Priority Data

Jun. 30, 2004    (JP)    .............................. 2004-194628

(51) Int. Cl.
*A47C 7/02*    (2006.01)
(52) U.S. Cl. .............................. 297/452.52; 297/452.49
(58) Field of Classification Search ............ 297/452.49, 297/452.52, 452.38; 24/545, 546, 293, 294, 24/295; 267/131, 110, 80; 403/286; 5/252, 5/246, 230
See application file for complete search history.

(56) References Cited

U.S. PATENT DOCUMENTS

| | | | | | |
|---|---|---|---|---|---|
| 3,208,119 | A | * | 9/1965 | Seckerson | .................. 52/716.6 |
| 3,628,780 | A | * | 12/1971 | Saito | ........................... 267/110 |
| 6,279,207 | B1 | * | 8/2001 | Vassiliou | ...................... 24/293 |
| 6,637,824 | B1 | * | 10/2003 | Yokota | .................. 297/452.18 |
| 2002/0117885 | A1 | * | 8/2002 | Barile et al. | ........... 297/452.52 |
| 2004/0160113 | A1 | * | 8/2004 | Rehfuss et al. | ......... 297/452.52 |

* cited by examiner

*Primary Examiner*—Milton Nelson, Jr.
(74) *Attorney, Agent, or Firm*—Dann, Dorfman, Herrell and Skillman, P.C.

(57) ABSTRACT

A retainer for fixing terminals of springs 7 to a round shaft 3 of a seat frame for a seat is disclosed. Each of the terminals of the springs is formed into a substantially U-shape. The retainer includes a body 6a of a substantially U-shape in cross-section which is adapted to be mounted on the round shaft 3, and pairs of first and second spring-engaging pieces 6b, 6c bent laterally from both edges of the U-shaped body 6a. The retainer is adapted to fix the substantially U-shaped terminals of the springs 7 to the round shaft 3 with the first and second spring-engaging pieces 6b, 6c thereof being engaged with the substantially U-shaped terminals of the springs 7.

7 Claims, 8 Drawing Sheets

RETAINER FOR FIXING TERMINALS OF SPRINGS

TECHNICAL FIELD

The present invention relates to a retainer for fixing terminals of a plurality of springs to be stretched between opposing frame sections of a seat frame for a seat so as to be spaced apart from one another and disposed in parallel with one another and, more particularly, to a retainer for fixing terminals of a plurality of springs, each of which has a substantially U-shape or C-shape, to a round shaft which is employed as a frame section constituting at least one of opposing frame sections of a seat frame for a seat.

Figure 1:
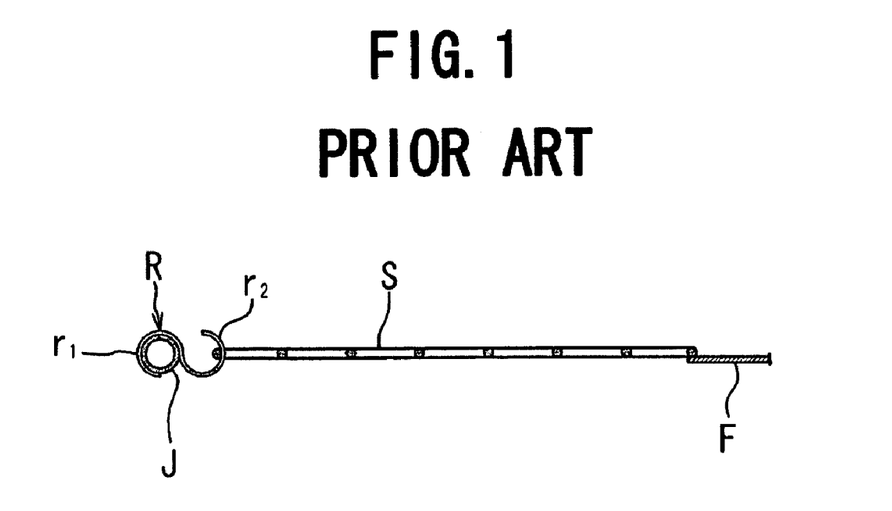
FIG. 1 is a schematic view which is of assistance in explaining a conventional structure for fixing terminals of springs in a vehicle seat.

In order to facilitate understanding of the structure of a retainer for fixing terminals of a plurality of springs according to the present invention, a conventional vehicle seat in which substantially S-shaped retainers for fixing terminals of a plurality of zigzag springs to a section of a seat cushion frame for a seat cushion of the vehicle seat is employed will be discussed hereinafter with reference to FIGS. 1 and 2. In the conventional vehicle seat, as shown in FIG. 1, a round shaft J is employed as a rearward frame section of the seat cushion frame and the zigzag springs S (only one zigzag spring S is shown in FIG. 1) are stretched between the round shaft J and a forward frame section F of the seat cushion frame. Terminals of the zigzag springs S are fixed to the round shaft J by the substantially S-shaped retainers R (only one retainer R is shown in FIG. 1) which comprise first loop-shaped portions $r_1$ to be fitted on the round shaft J and second loop-shaped portions $r_2$ to be engaged with the terminals of corresponding zigzag springs S. In the vehicle seat, the zigzag springs S are stretched between the round shaft J of the seat cushion frame and the forward frame section F of the seat cushion frame as means to support a cushion, with the terminals thereof being engaged with the second loop-shaped portions $r_2$ of the corresponding retainers R fitted on the round shaft J through the first loop-shaped portions $r_1$ (Japanese Patent Application Laid-Open No. 2002-142908).

Figure 2:
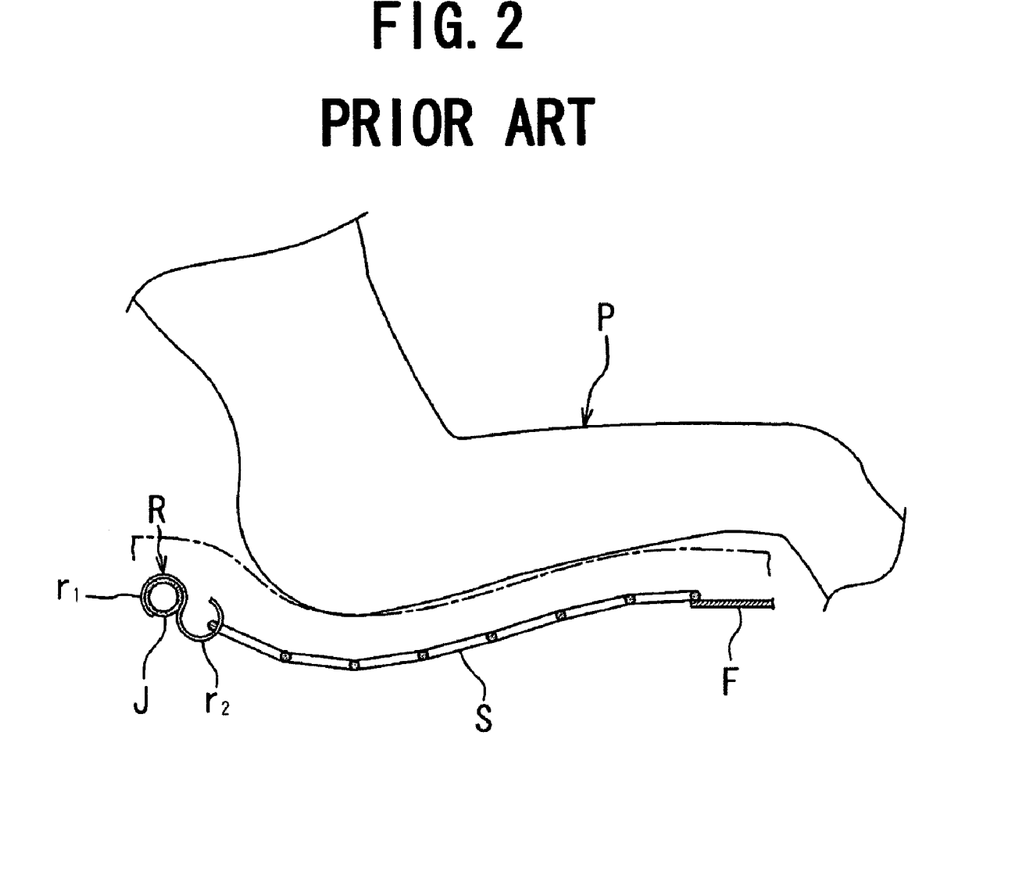
FIG. 2 is a schematic view illustrating the structure of FIG. 1 in a state where an occupant sits on the vehicle seat of FIG. 1.

In the conventional vehicle seat, when an occupant sits on the vehicle seat and a weight load of the occupant sitting on the vehicle seat is then applied to the vehicle seat, the springs S are made to flex as shown in FIG. 2 (only one spring S is shown in FIG. 2). As the springs S are made to flex, the retainers R (only one retainer R is shown in FIG. 2) are swung in a clockwise direction relative to the round shaft J, while being pulled downward by the springs S. At this time, the round shaft J is rubbed by the retainers R which are being swung relative to the round shaft J, so that there is a possibility that noise will be generated. In addition, each of the retainers R is formed into a substantially S-shape as discussed above, so that as the weight load of the occupant is applied to the vehicle seat, the entire retainers R are pulled downward by the springs S and gradually deformed. Therefore, when the occupant sits on the vehicle seat several times, the retainers R are irrecoverably deformed.

DISCLOSURE OF THE INVENTION

It is therefore an object of the present invention to provide a retainer for fixing terminals of springs, which can stably fix the ene terminals of the springs to be stretched between opposing frame sections of a seat frame for a seat, to a round shaft which is employed as a frame section constituting at least one of the opposing frame sections of the seat frame, which can prevent such generation of noise as occurring due to the swinging of the retainers by the bending of the springs in the conventional vehicle seat, and which can prevent irrecoverable deformation of the retainer and thus facilitates maintaining of a good cushioning property of the seat.

In accordance with the present invention, there is provided a retainer for fixing ene terminals of springs to a seat frame for a seat. The seat frame comprises a pair of spaced apart side frame sections which are opposed to each other, the side frame sections having first and second end portions, a first intermediate frame section interconnecting the first end portions of the side frame sections, and a second intermediate frame section interconnecting the second end portions of the side frame sections and opposed to the first intermediate frame section. At least one of the side, first and second intermediate frame sections is formed from a round shaft. Each of the springs has first and second terminals. The first terminals are adapted to be fixed to one of the side, first and second intermediate frame sections which is opposed to the round shaft. The second terminals are each formed into a substantially U-shape in outline and comprises first and second spaced apart axial portions and an intermediate axial portion interconnecting the first and second axial portions. The retainer comprises a longitudinal body of a substantially U-shape in cross-section, and pairs of first and second spring-engaging pieces provided at the U-shaped longitudinal body. The first spring-engaging pieces are bent laterally from one edge of the substantially U-shaped body. The second spring-engaging pieces are bent laterally from the other edge of the substantially U-shaped body. The substantially U-shaped body is adapted to be mounted on the round shaft with an opening side thereof facing downwardly. The second terminals of the springs are adapted to be retained to the round shaft with the first axial portions and the second axial portions being engaged with the first spring-engaging pieces and the second spring-engaging pieces, respectively, and with the intermediate axial portions being located under the round shaft and engaged with the round shaft.

In a preferred embodiment according to the present invention, the substantially U-shaped body of the retainer is adapted to be mounted on the round shaft with the first spring-engaging pieces being located inside the seat frame and with the second spring-engaging pieces being located outside the seat frame. The first spring-engaging pieces arc each bent perpendicularly to the U-shaped body from the one edge of the substantially U-shaped body of the retainer. The second spring-engaging pieces are each bent into a substantially U-shape.

In a preferred embodiment according to the present invention, the substantially U-shaped body of the retainer comprises a plurality of body members of substantially U-shapes in cross-section and the pairs of first and second spring-engaging pieces are provided at corresponding body members, each of the body members including the first and second spring-engaging pieces being formed by bending a strip-shaped metal plate in a predetermined shape.

In a preferred embodiment according to the present invention, the substantially U-shaped body of the retainer has a length substantially corresponding to an entire length of the round shaft and the pairs of first and second spring-engaging pieces are spaced at regular intervals apart from one another along the substantially U-shaped body.

In the seat in which the second terminals of the springs are fixed to the round shaft of the seat by the retainer according to the present invention, when an occupant sits on the seat and a weight load of the occupant is applied to the seat to thereby make the springs flex downwardly, even if the retainer is subjected to a force which tends to cause the retainer to be swung or rotated relative to the round shaft, an opposing force is produced at the second axial portions of the springs which are retained by the second spring-engaging pieces of the retainer outwardly of the seat frame. That is, the opposing force acts as a torsional torque since the U-shaped body of the retainer is nipped by the first and second axial portions of the springs, so that the retainer is not rotated relative to the round shaft and is maintained in the mounted condition where the opening side of the U-shaped body is faced downwardly.

Therefore, the springs are stably fixed at the second terminals thereof to the round shaft through the retainer and any noise is not generated since the retainer is not swung or rotated relative to the round shaft when the springs are pulled downward and made to flex. In addition, the retainer is not deformed even if it is pulled by the springs, so that the retainer according to the present invention facilitates maintaining of a good cushioning property of the seat.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference characters designate like or corresponding parts throughout the Figures and wherein:

FIG. 4b is a schematic plan view illustrating the structure of FIG. 4a;

DETAILED DESCRIPTION OF THE PREFERRED EMBODIMENTS

Figure 3:
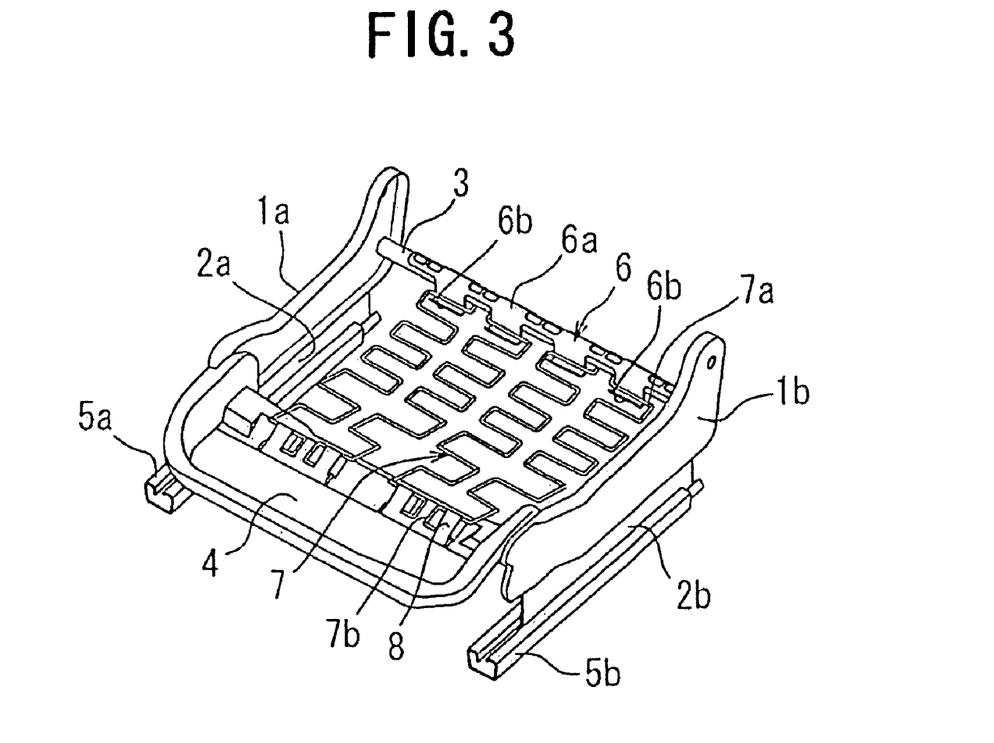
FIG. 3 is a schematic perspective view of a seat cushion frame for a seat cushion of a vehicle seat in which springs are fixed to the seat cushion frame by a retainer according to the present invention.

Referring now to FIG. 3, there is illustrated a normal slide-type vehicle seat in which springs are employed as means to support a cushion of the vehicle seat and fixed at terminals thereof to a cushion frame for the vehicle seat by a retainer according to the present invention. As will be discussed in greater detail hereinafter, the retainer also provides advantageous effects when the retainer is applied to a vehicle seat provided with a lifter mechanism for adjusting a height of the vehicle seat. First of all, a normal slide-type vehicle seat without such a lifter mechanism, in which springs are fixed at terminals thereof to a cushion frame for a seat cushion of the vehicle seat by the retainer according to the present invention, will be discussed hereinafter.

The cushion frame is formed into a substantially quadrilateral shape and comprises a pair of spaced apart left and right side frame sections 1a, 1b, a pair of spaced apart movable rail members 2a, 2b attached to lower portions of the side frame sections 1a, 1b, a round shaft 3 formed from a round pipe or round rod, the round shaft 3 being disposed between rear end portions of the side frame sections 1a, 1b and attached to the rear end portions of the side frame sections 1a, 1b, and a pan frame member 4 attached to forward end portions of the side frame sections 1a, 1b. In FIG. 3, reference numerals 5a, 5b denote stationary rail members to which the movable rail members 2a, 2b are movably supported.

In the cushion frame, a plurality of springs 7, each of which constitutes a zigzag spring comprising a plurality of substantially U-shaped axial portions continuously connected to one another, are stretched between the round shaft 3 and the pan frame member 4 so as to be arranged in parallel with one another and spaced apart from one another. The zigzag springs 7 are horizontally stretched between the round shaft 3 and the pan frame member 4 by causing rearward terminals 7a of the zigzag springs 7 to be fixed to the round shaft 3 through the retainer 6 and by causing forward terminals 7b of the zigzag springs 7 to be retained to substantially arch-shaped engaging pieces 8 which are provided at the pan frame member 4 by causing regions of the pan frame member 4 to be cut and then causing the cut regions of the pan frame member 4 to be raised up from a surface of the pan frame member 4.

Figure 4A:
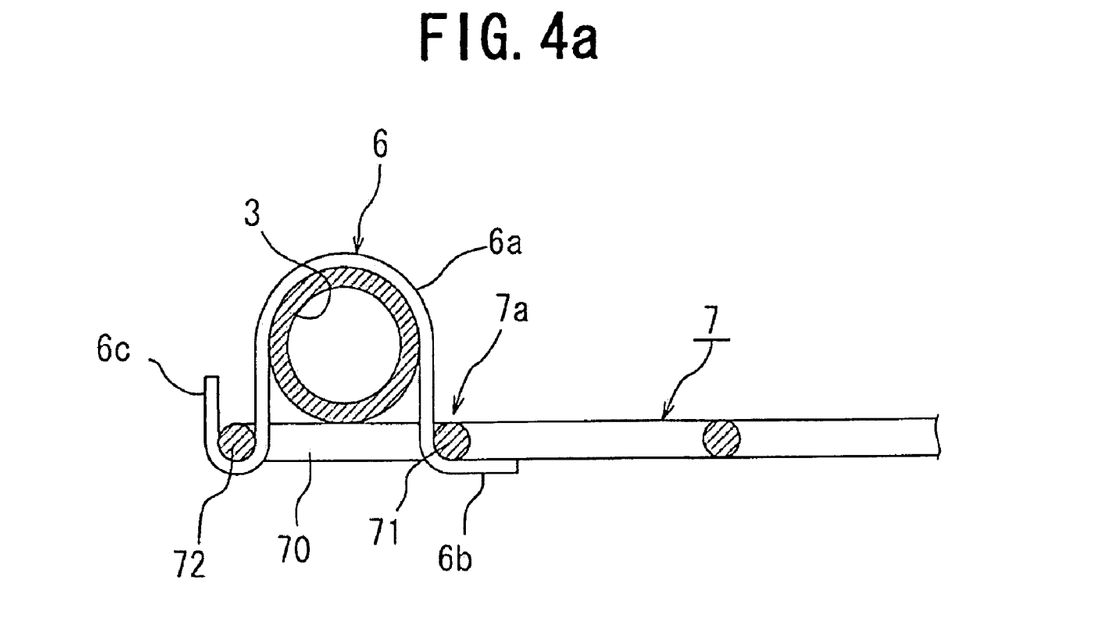
FIG. 4a is a schematic partially sectional side view illustrating a structure for fixing terminals of the springs to a frame section of the seat cushion frame by the retainer of FIG. 3.
Figure 4B:
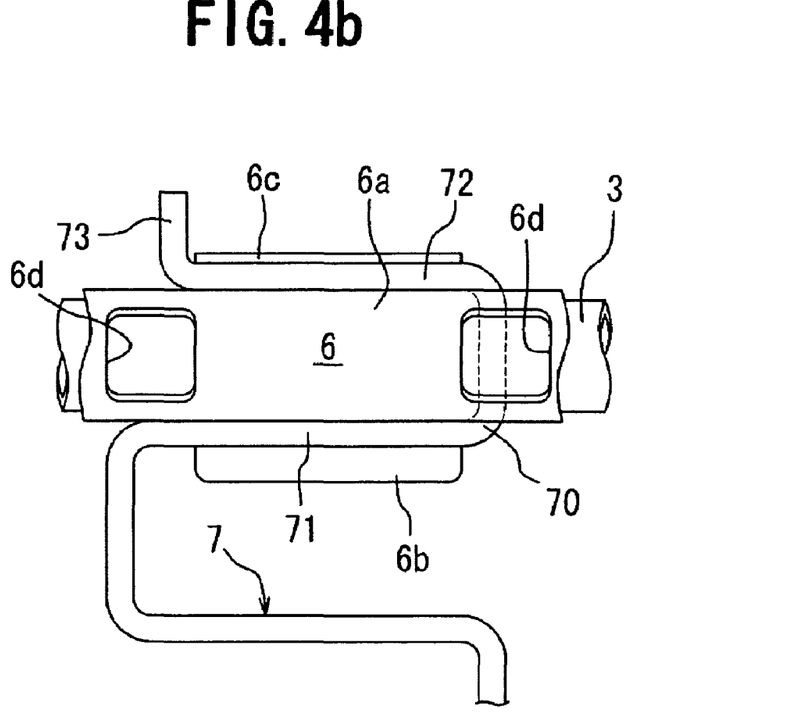

Referring now to FIG. 4a, the retainer 6 comprises a longitudinal body 6a of a substantially U-shape in cross-section mounted on the round shaft 3 with an opening side thereof facing downwardly, and pairs of spring-engaging pieces 6b, 6c (only one pair of spring-engaging pieces 6b, 6c are shown in FIG. 4a) bent laterally from both edges of the substantially U-shaped body 6a. As shown in FIG. 4b, a substantially U-shaped portion of each of the zigzag springs 7 (only one zigzag spring 7 is shown in FIG. 4b) which is provided at the rearward terminal of the zigzag spring 7 comprises a pair of spaced apart axial portions 71, 72 and an intermediate axial portion 70 interconnecting the spaced apart axial portions 71, 72. The rearward terminal of the zigzag spring 7 is fixed to the round shaft 3 through the retainer 6, the substantially U-shaped body 6a of which is mounted on the round shaft 3. More particularly, the rearward terminal of the zigzag spring 7 is fixed to the round shaft 3 through the retainer 6 with the spaced apart axial portions 71, 72 being engaged with corresponding spring-engaging pieces 6b, 6c of the retainer 6. In this way, rearward terminals of the zigzag springs 7 are fixed to the round shaft 3 through the retainer 6.

Figure 5A:
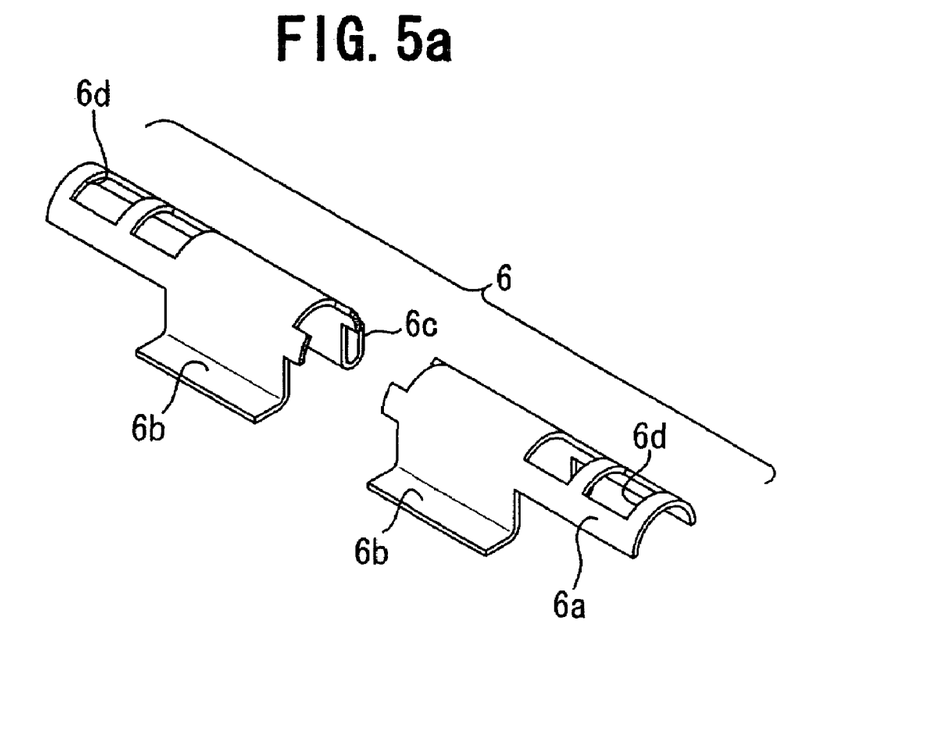
FIG. 5a is a perspective view illustrating the retainer as viewed from the inside of the seat cushion frame, in which a substantially middle section of the retainer is omitted.
Figure 5B:
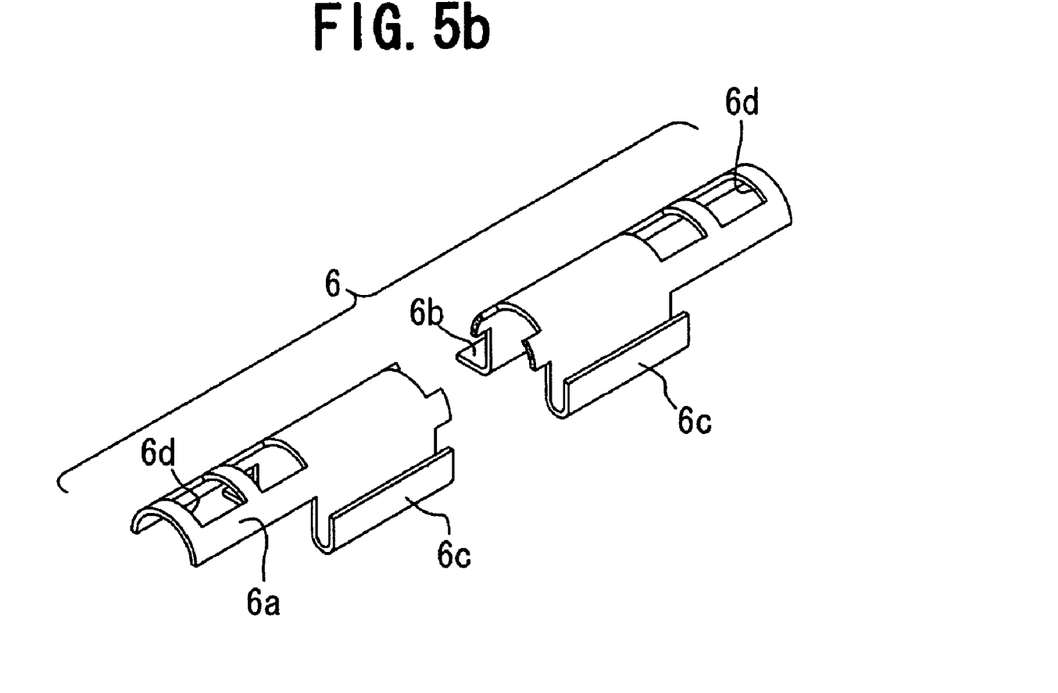
FIG. 5b is a perspective view illustrating the retainer as viewed from the outside of the seat cushion frame, in which the substantially middle section of the retainer is omitted.

The substantially U-shaped body 6a of the retainer 6 has a length substantially corresponding to the entire length of the round shaft 3 (see FIG. 3). As shown in FIGS. 5a, 5b illustrating the retainer 6 in which a substantially middle section of the retainer 6 is omitted, several pairs of spaced apart spring-engaging pieces 6b, 6c are disposed at regular intervals along the longitudinal U-shaped body 6a of the retainer 6.

Of the spring-engaging pieces 6b, 6c of the retainer 6, the spring-engaging pieces 6b located inside the cushion frame in a condition where the retainer 6 is mounted on the round shaft 3, is formed into a plate-shape and projects from one edge of the substantially U-shaped body 6a so as to be substantially perpendicular to the substantially U-shaped body 6a. The spring-engaging pieces 6c located outwardly of the cushion frame in the condition where the retainer 6 is mounted on the round shaft 3, extends from the other edge of the substantially U-shaped body 6a of the retainer 6 and is formed into a substantially U-shape. Incidentally, in FIGS. 4b, 5a and 5b, a reference numeral 6d designates through-holes for facilitating causing of the substantially U-shaped body 6a to be lightweight.

The substantially U-shaped rearward terminal of each of the springs 7 is fixed to the round shaft 3 of the cushion frame through the retainer 6 mounted on the round shaft 3, with the axial portions 71, 72 thereof being engaged with the corresponding spring-engaging pieces 6c, 6b of the retainer 6 and with the intermediate axial portion 70 thereof being located under the round shaft 8 and engaged with a lower surface of the round shaft 8. As shown in FIG. 4b, the axial portion 72 of the rearward terminal of the spring 7 which is engaged with the spring-engaging piece 6c of the retainer 6 is provided at a free end thereof with an engaging axial region 73 which is bent perpendicularly to the axial portion 72. The engaging axial region 73 of the spring 7 is engaged with an edge of the corresponding spring-engaging piece 6c of the retainer 6, so that the rearward terminal of the spring 7 can be further securely retained to the retainer 6.

Figure 6:
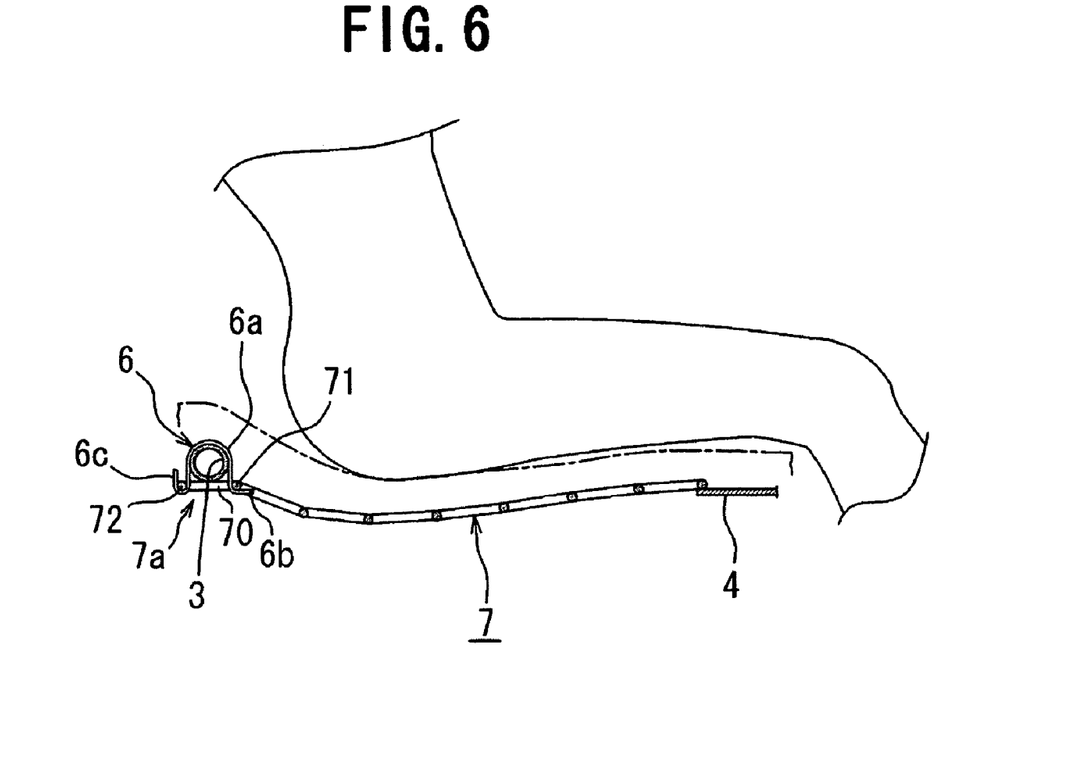
FIG. 6 is a schematic view which is of assistance in explaining the structure of FIG. 3 in a condition where an occupant sits on the vehicle seat.

In the vehicle seat in which the springs 7 are fixed to the round shaft 3 of the cushion frame through the retainer 6 constructed as discussed above, when the occupant sits on the vehicle seat and the weight load of the occupant is then applied to the seat cushion, the springs 7 are made to downwardly flex as shown in FIG. 6 (only one spring 7 is shown in FIG. 6). At this time, even if the retainer 6 is pulled downward by the downward flexing of the springs 7 and a force which tends to cause the retainer 6 to be rotated relative to the round shaft 3 is thus applied to the retainer 6, an opposing force is produced at the axial portions 72 of the springs 7 which are retained by the spring-engaging pieces 6c of the retainer 6 outwardly of the cushion frame.

The opposing force acts as a torsional torque since the U-shaped body 6a of the retainer 6 is nipped by the axial portions 71, 72 of the springs 7, so that the retainer 6 is not rotated relative to the round shaft 3 and is maintained in a mounted condition where the opening side of the U-shaped body 6a is faced downwardly. Therefore, as is the case where the springs 7 are attached at the rearward terminals thereof directly to the round shaft, any noise is not generated since the retainer 6 is not swung or rotated relative to the round shaft 3 when the springs 7 are pulled downward and made to flex. In addition, the retainer 6 is not deformed even if it is pulled by the springs 7.

While the case where the rearward terminals of the springs are fixed through the retainer to the round shaft which is employed as the rear frame section of the cushion frame is discussed above, the retainer of the present invention may be also applied to a cushion frame in which a round shaft is employed in lieu of the pan frame member, and a cushion frame in which round shafts are employed as rearward and forward frame sections of the cushion frame. Furthermore, the retainer according to the present invention can be applied to a seat back frame in which a plurality of springs are to be fixed at terminals thereof to the seat back frame.

Figure 7A:
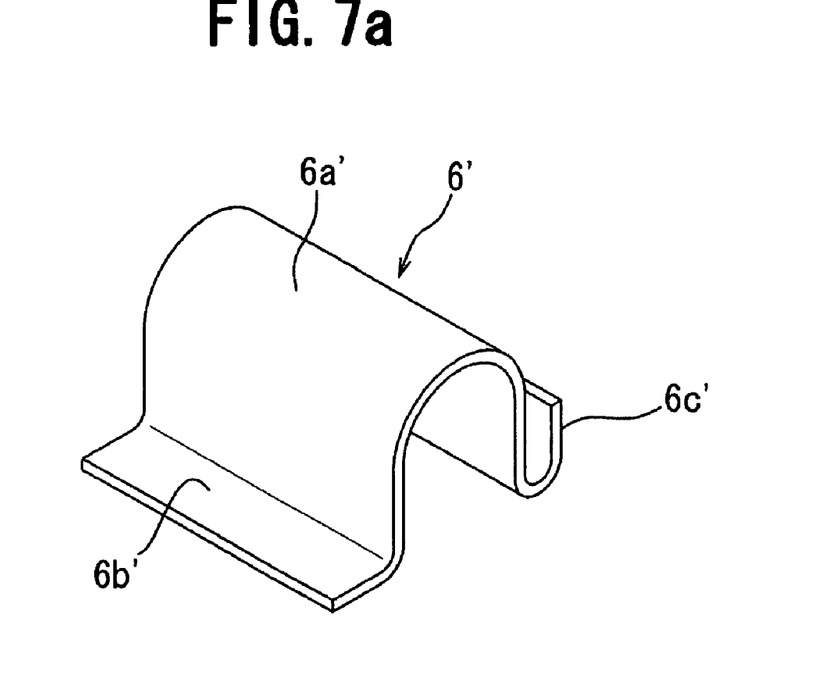
FIG. 7a is a schematic perspective view of a retainer member of a retainer according to a second embodiment of the present invention, as viewed from the inside of the seat cushion frame.
Figure 7B:
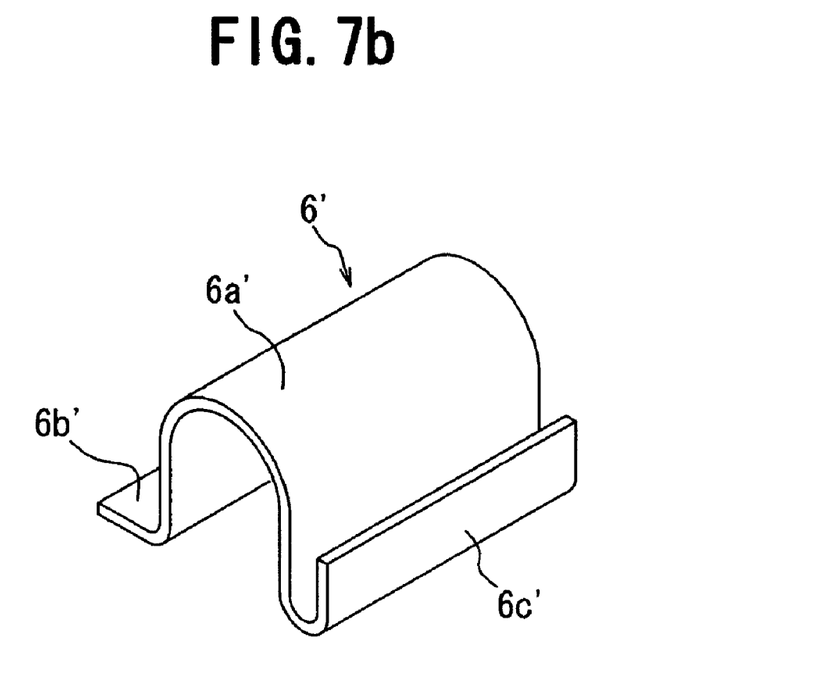
FIG. 7b is a schematic perspective view of the retainer member of the retainer as viewed from the outside of the seat cushion frame.

In the above-mentioned embodiment, a plurality of the springs are fixed at the rearward terminals thereof to the cushion frame by the retainer 6. However, a plurality of springs may be fixed at terminals thereof to the cushion frame by a retainer which comprises a plurality of retainer members 6' that correspond in number to the springs and are constructed as shown in FIGS. 7a and 7b (only one retainer member 6' is shown in FIGS. 7a and 7b). Each of the retainer members 6' comprises a body 6a' of a substantially U-shape in cross-section to be mounted on the round shaft 3, and a pair of spring-engaging pieces 6b', 6c' provided so as to project laterally from both edges of the substantially U-shaped body 6a'. The retainer member 6' is formed by causing a strip-shaped metal plate to be bent in a predetermined shape. The spring-engaging pieces 6b', 6c' are designed in the substantially same maimer as the spring-engaging pieces 6b, 6c are done. The retainer members 6' are mounted on the round shaft of the cushion frame so as to be spaced apart from one another at regular intervals.

Figure 8:
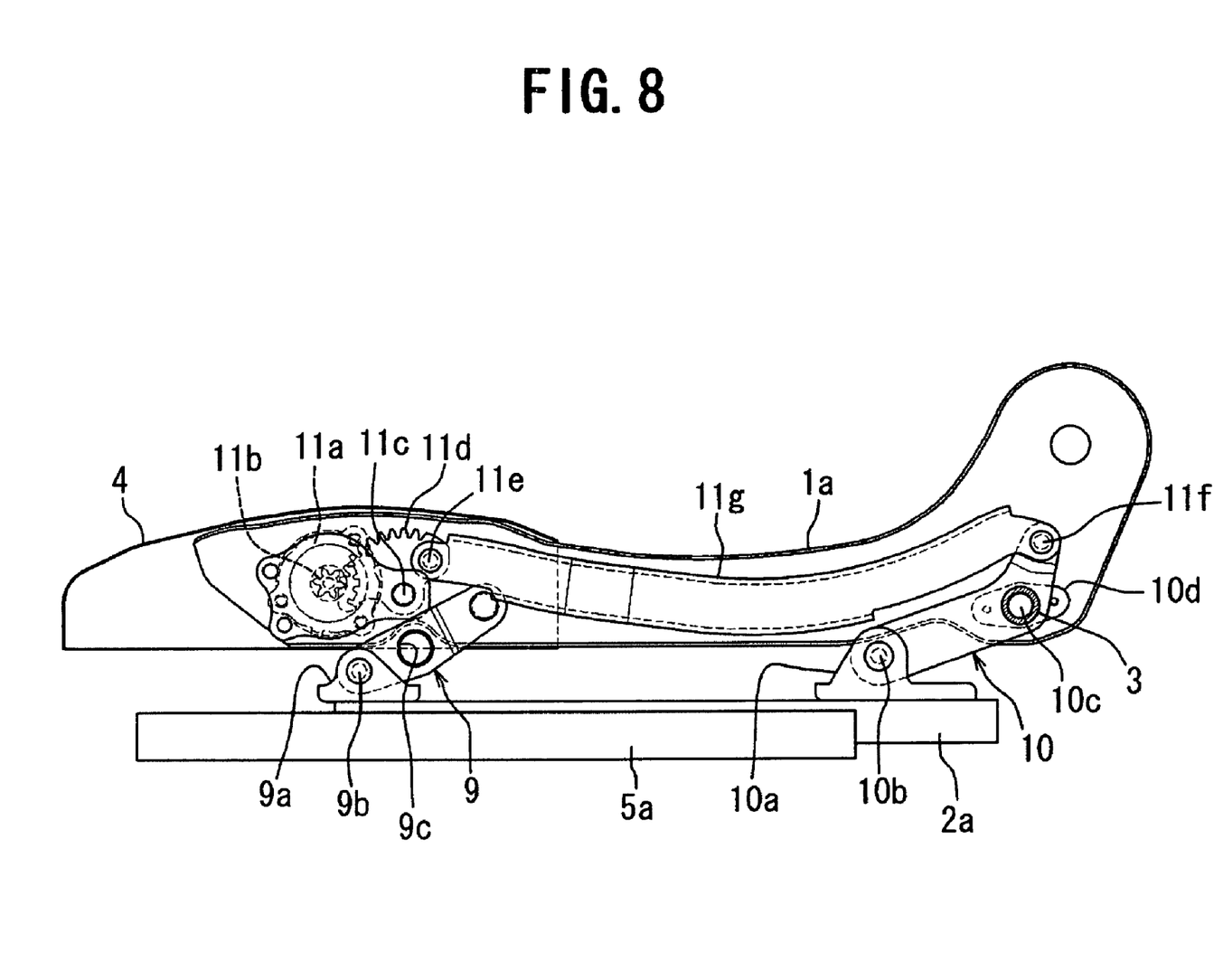
FIG. 8 is a schematic side view of a seat cushion frame with a lifter mechanism for adjusting a height of a seat, to which the retainer according to the present invention can be applied.

The retainers 6, 6' can be effectively applied to a cushion frame for a seat cushion of a vehicle seat, which is provided with a lifter mechanism for adjusting a height of the vehicle seat. Referring now to FIG. 8, the lifter mechanism includes two pairs of forward and rearward linkage members 9, 10 coupled between the side frame sections 1a, 1b and the movable rail members 2a, 2b (only one pair of forward and rear linkage members 9, 10, only the side frame section 1a, and only the movable rail member 2a are shown in FIG. 8).

The forward linkage members 9 and the rearward linkage members 10 are pivotally supported at lower end portions thereof through support pins 9b, 10b to standing brackets 9a, 10a which are mounted to the movable rail members 2a, 2b. The rearward linkage members 10 extend lengthwise relative to the forward linkage members 9 and are each bent into a substantially L-shape. The rearward linkage members 10 are connected at substantially middle portions thereof to the side frame sections 1a, 1b by support pins 10c which are penetrated through the substantially middle portions of the rearward linkage members 10 (only one support pin 10c is shown in FIG. 8). The forward linkage members 9 are coupled to each other by a connecting shaft 9c. Also, the rearward linkage members 10 are coupled to each other by the round shaft 3.

The rearward linkage members 10 are coupled through washers 10d to the side frame sections 1a, 1b by the support pins 10c. Incidentally, the movable rail members 2a, 2b are slidably supported to the stationary rail members 5a, 5b mounted on a vehicle floor (only the stationary rail member 5a is shown in FIG. 8).

The lifter mechanism further includes actuating means for actuating the forward and rearward linkage members 9, 10. The actuating means comprises a dial-type operating knob 11a arranged outside the cushion frame and having a rotating axis which penetrates a side of the pan frame member 4 and the side frame section 1a and projects in the cushion frame, a pinion gear 11b mounted on an inner end portion of the rotating axis of the operating knob 11a, a sector gear 11d rotatably supported to an inner portion of the side frame member 1a by a support pin 11c and meshed with the pinion gear 11b, and a rod 11g extending between the sector gear 11d and the rearward linkage member 10 adjacent the side frame section 1a. The rod 11g is connected at one end thereof to the sector gear 11d through a support pin 11e, and connected at the other end thereof to the rearward linkage member 10 through a support pin 11f.

In the vehicle seat provided with the lifter mechanism constructed as discussed above, when the vehicle seat is located at a lower position as shown in FIG. 8, the forward and rearward linkage members 9, 10 are inclined rearward.

Figure 9:
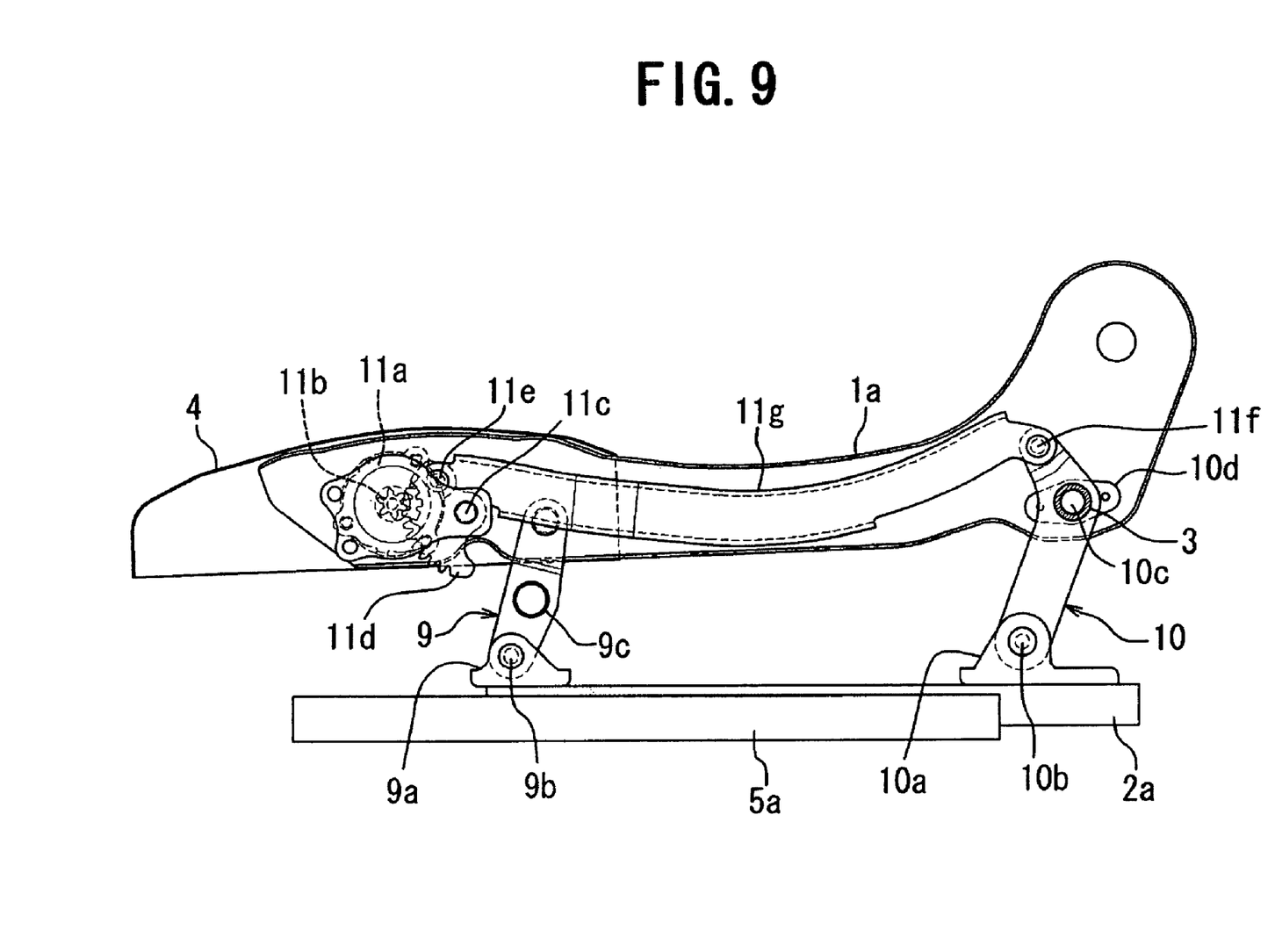
FIG. 9 is a schematic side view which is similar to FIG. 8 and of assistance in explaining a condition where the vehicle seat of FIG. 8 is lifted up.

In the condition of FIG. 8, when the rotating axis of the operating knob 11a is rotated in a clockwise direction, the pinion gear 11b is rotated in the same direction. As the pinion gear 11b is rotated in the direction, the sector gear 11d meshed with the pinion gear 11b is rotated in the opposite direction or in a counterclockwise direction, whereby the rod 11g is pulled and moved forward. The forward movement of the rod 11g causes the rearward linkage members 10 to rotate around the support pins 10b so as to stand up, and then causes the forward linkage members 9 to rotate around the support pins 9b so as to stand up. Thus, the vehicle seat is lifted up as shown in FIG. 9.

Figure 10:
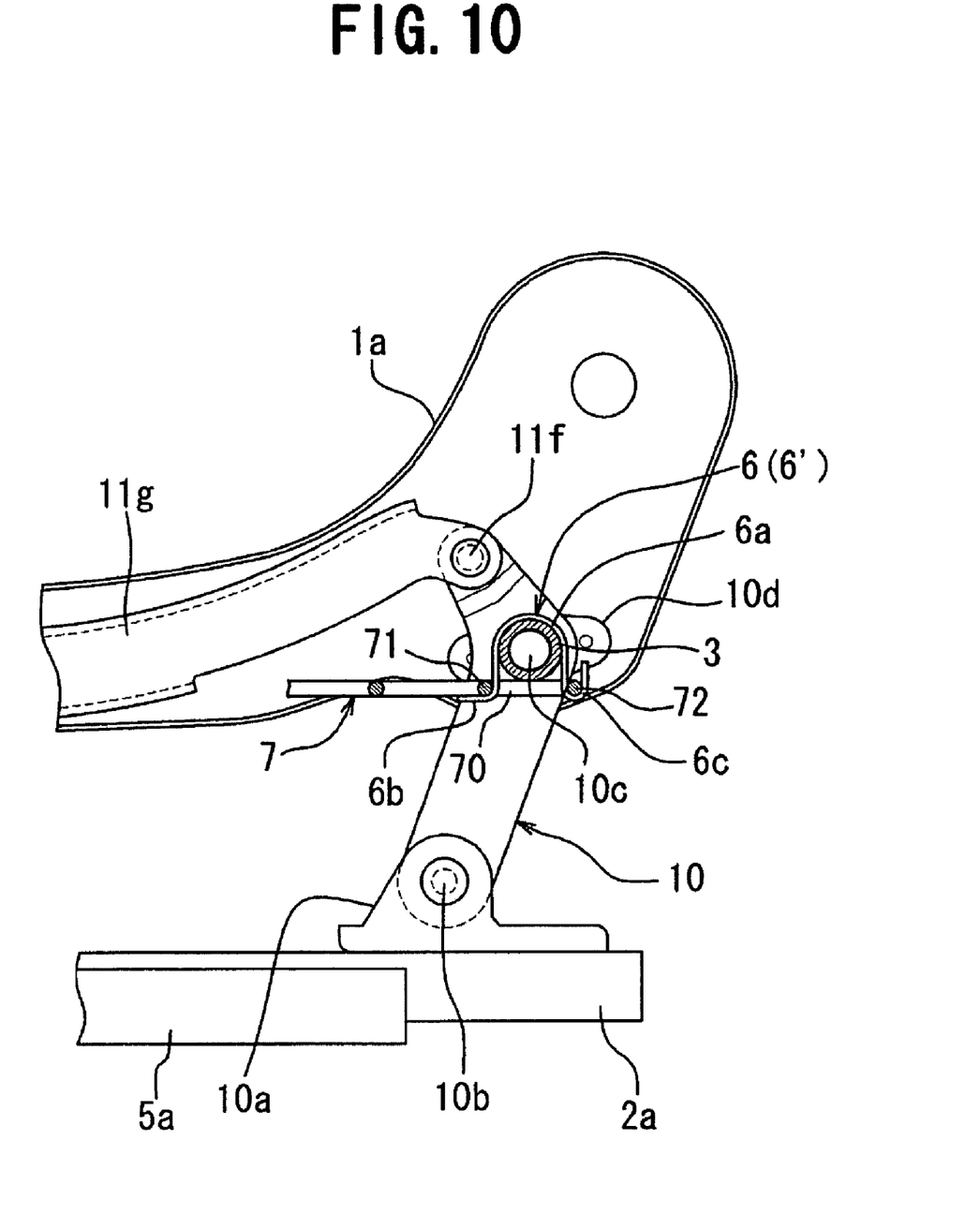
FIG. 10 is a fragmentary enlarged side view which is of assistance in explaining the retainer mounted to the seat cushion frame of FIG. 9.

Even if the round shaft 3 connected to the support pins 10c is rotated as the rearward linkage members 10 are rotated around the support pins 10b, the retainer 6 (or the retainer member 6') is not moved relative to the round shaft 3 and maintained in the mounted condition in which the opening side of the U-shaped body 6a (6a') of the retainer 6 (or the retainer member 6') faces downwardly as shown in FIG. 10. Thus, an effective length of each of the springs 7 in the vehicle seat according to the present invention is kept constant because the rearward terminals of the springs 7 are not wound around the round shaft differently to a case where the rearward terminals of the springs are coupled directly to the round shaft. In addition, the springs can be stably fixed at the rearward terminals thereof to the round shaft of the cushion frame by the retainer according to the present invention.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

What is claimed is:

1. A retainer for fixing terminals of springs to a seat frame for a seat, wherein said seat frame comprises a pair of spaced apart side frame sections which are opposed to each other; said side frame sections having first and second end portions; a first intermediate frame section interconnecting said first end portions of said side frame sections; and a second intermediate frame section interconnecting said second end portions of said side frame sections and opposed to said first intermediate frame section; at least one of said side frame sections and said first and second intermediate frame sections being formed from a round shaft; said springs having first and second terminals; said first terminals being adapted to be fixed to one of said side frame sections and said first and second intermediate frame sections which is opposed to said round shaft; said second terminals being each formed into a substantially U-shape in outline and comprising first and second spaced apart axial portions and an intermediate axial portion interconnecting said first and second axial portions; said retainer comprising:

a longitudinal body of a substantially U-shape in cross-section, and pairs of first and second spring-engaging pieces provided at said U-shaped longitudinal body;

said first spring-engaging pieces being bent laterally from one edge of said substantially U-shaped body and perpendicularly to said U-shaped body from the one edge of said substantially U-shaped body for engaging with said first axial portions;

said second spring-engaging pieces being bent into substantially U-shapes laterally from the other edge of said substantially U-shaped body for engaging with said second axial portions; and said substantially U-shaped body being adapted to be mounted on said round shaft with an opening side thereof facing downwardly, with said first spring-engaging pieces being located inside said seat frame and with said second spring-engaging pieces being located outside said seat frame;

whereby said retainer is adapted for retaining said second terminals of said springs to said round shaft such that said intermediate axial portions can be located under said round shaft and engaged with said round shaft.

2. A retainer according to claim 1, wherein said substantially U-shaped body of said retainer has a length that substantially corresponds to an entire length of said a round shaft that forms a side frame section or an intermediate frame section in a seat frame and said pairs of first and second spring-engaging pieces are spaced at regular intervals apart from one another along said substantially U-shaped body.

3. A retainer according to claim 1, wherein said substantially U-shaped body of said retainer comprises a plurality of body members of substantially U-shapes in cross-section and said pairs of first and second spring-engaging pieces are provided at corresponding body members, each of said body members including said first and second spring-engaging pieces being formed by bending a strip-shaped metal plate in a predetermined shape.

4. A seat frame for a seat comprising:

a pair of spaced apart side frame sections which are opposed to each other;

said side frame sections having first and second end portions;

a first intermediate frame section interconnecting said first end portions of said side frame sections;

a second intermediate frame section interconnecting said second end portions of said side frame sections and opposed to said first intermediate frame section;

at least one of said side frame sections and said first and second intermediate frame sections being formed from a round shaft;

springs having first and second terminals;

said first terminals being adapted to be fixed to one of said side frame sections and said first and second intermediate frame sections which is opposed to said round shaft;

said second terminals being each formed into a substantially U-shape in outline and comprising first and second spaced apart axial portions and an intermediate axial portion interconnecting said first and second axial portions; and a retainer comprising a longitudinal body of a substantially U-shape in cross-section, and pairs of first and second spring-engaging pieces provided at said U-shaped longitudinal body;

said first spring-engaging pieces being bent laterally from one edge of said substantially U-shaped body;

said second spring-engaging pieces being bent laterally from the other edge of said substantially U-shaped body;

said substantially U-shaped body being adapted to be mounted on said round shaft with an opening side thereof facing downwardly; and said second terminals of said springs being adapted to be retained to said round shaft with said first axial portions and said second axial portions being engaged with said first spring-engaging pieces and said second spring-engaging pieces, respectively, and with said intermediate axial portions being located under said round shaft and engaged with said round shaft.

5. A seat frame according to claim 4, wherein said substantially U-shaped body of said retainer is adapted to be mounted on said round shaft with said first spring-engaging pieces being located inside said seat frame and with said second spring-engaging pieces being located outside said seat frame, said first spring-engaging pieces each being bent perpendicularly to said U-shaped body from the one edge of said substantially U-shaped body of said retainer, and said second spring-engaging pieces each being bent into a substantially U-shape.

6. A seat frame according to claim 4 or 5, wherein said substantially U-shaped body of said retainer comprises a plurality of body members of substantially U-shapes in cross-section and said pairs of first and second spring-engaging pieces are provided at corresponding body members, each of said body members including said first and second spring-engaging pieces being formed by bending a strip-shaped metal plate in a predetermined shape.

7. A seat frame according to claim 4 or 5, wherein said substantially U-shaped body of said retainer has a length substantially corresponding to an entire length of said round shaft and said pairs of first and second spring-engaging pieces are spaced at regular intervals apart from one another along said substantially U-shaped body.

* * * * *